(No Model.) 2 Sheets—Sheet 1.
E. J. J. B. BENOIT & J. SOLER Y VILA.
PROCESS OF AND APPARATUS FOR SEPARATING OLEINE AND STEARINE FROM SUET.
No. 498,375. Patented May 30, 1893.
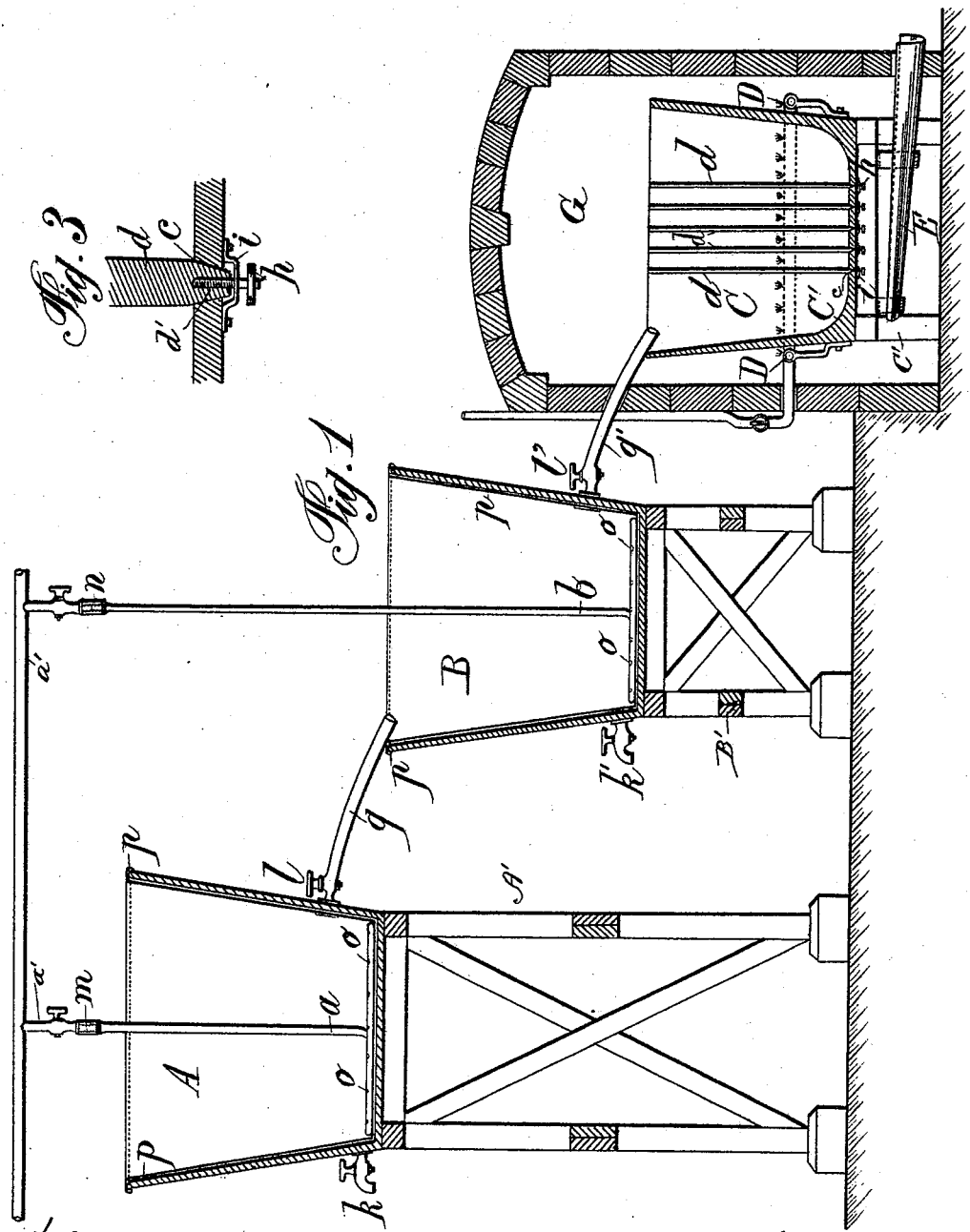

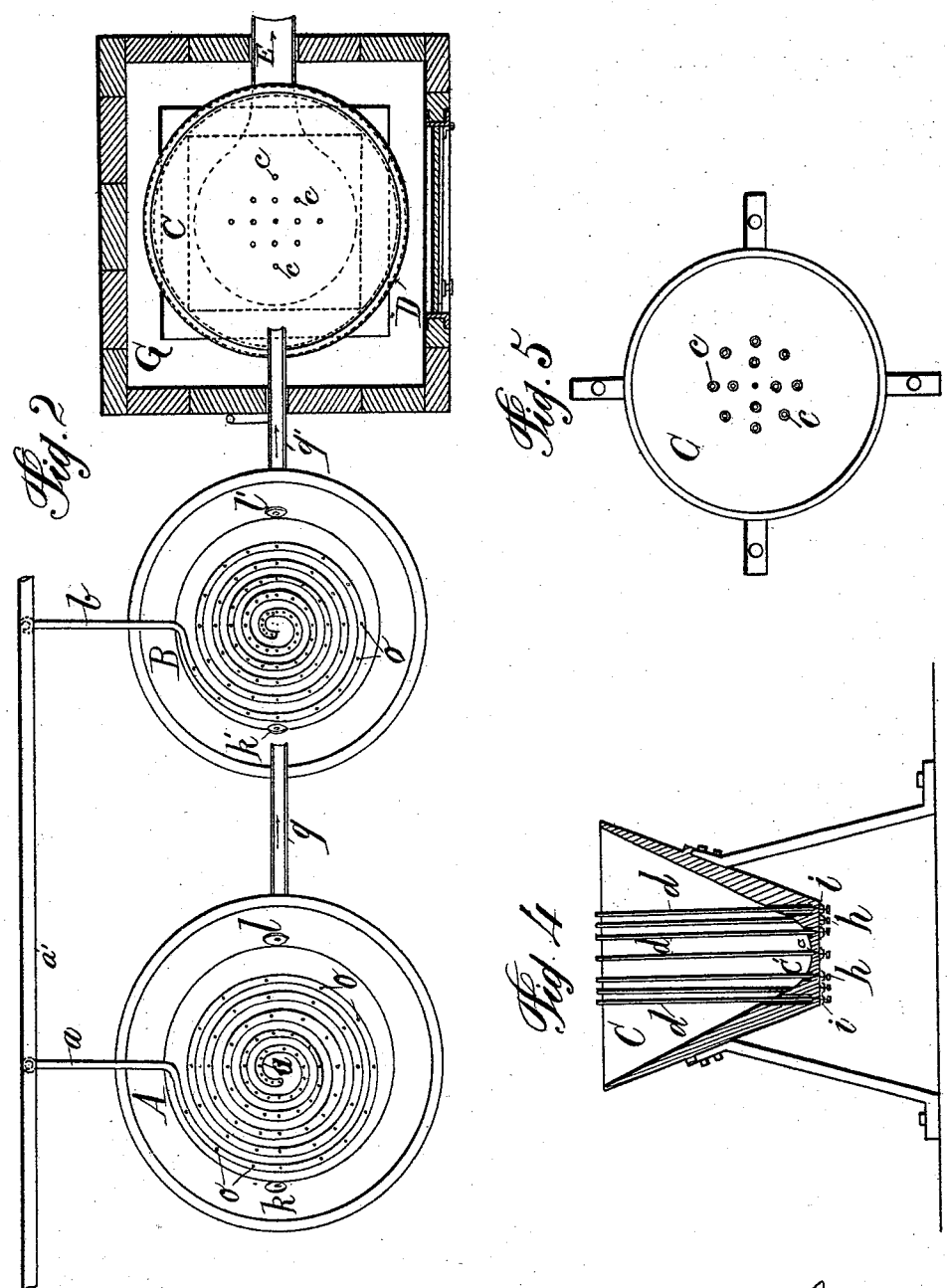

UNITED STATES PATENT OFFICE.

EDOUARD JOSEPH JEAN BAPTISTE BENOIT AND JOSÉ SOLER Y VILA, OF PARIS, FRANCE.

PROCESS OF AND APPARATUS FOR SEPARATING OLEINE OR STEARINE FROM SUET.

SPECIFICATION forming part of Letters Patent No. 498,375, dated May 30, 1893.

Application filed November 8, 1892. Serial No. 451,400. (No model.) Patented in France August 21, 1891, No. 215,639.

*To all whom it may concern:*

Be it known that we, EDOUARD JOSEPH JEAN BAPTISTE BENOIT, a citizen of the French Republic, and JOSÉ SOLER Y VILA, a subject of the King of Spain, both residents of Paris, France, have invented certain new and useful Improvements in the Process of and Apparatus for Separating Oleine and Stearine from Suet, (for which we have obtained Letters Patent in France, No. 215,639, dated August 21, 1891,) of which the following is a description.

Our invention relates to a process of and apparatus for extracting or separating oleine and stearine from suet or rendered tallow for manufacturing purposes, and has for its object to extract or separate in a simple, inexpensive, and expeditious manner the oleine and stearine without the use of hydraulic or other presses as heretofore.

Our invention consists primarily in the process whereby said separation of the oleine and stearine may be effected, as hereinafter fully described.

Our invention also consists in the construction, arrangement and combination of parts of the apparatus whereby our process may be carried out, all as hereinafter fully described, illustrated in the accompanying drawings and pointed out in the appended claims.

In said drawings:—Figure 1 is a sectional elevation of the complete apparatus; Fig. 2 a plan view thereof; Fig. 3 a detail sectional view of one of the discharge valves for the tank or vat C. Figs. 4 and 5 are a sectional elevation and plan respectively of a slightly different shape of vat C.

Heretofore in the extraction of oleine and stearine from suet or rendered tallow for manufacturing purposes it has been customary to employ hydraulic presses for accomplishing the desired object, which presses were very costly and not effecting as complete a separation of the said products as might be desired. In our invention we dispense with the use of presses and accomplish the separation by means of chemical agents as will now be described in detail.

For carrying out our process we employ the apparatus illustrated in the drawings and which consists essentially of three vats A, B, C, though if desired the number as well as the capacities of these vats may be varied according to the quantity of material to be treated. The vats A B are similar in construction and may be of any suitable material and lined with sheet metal $p$, as shown. Leading into the vat A is a pipe $a$, which at the bottom of said vat is coiled into serpentine form and provided with a number of fine perforations $o$. The pipe $a$, is connected detachably to a pipe $a'$ by means of a coupling $m$, said pipe $a'$ leading off to a suitable source of steam supply. A pipe $b$, connected detachably to the pipe $a'$ by coupling $n$, leads into vat B and is coiled into serpentine form and finely perforated at $o$. The two vats A, B, communicate with each other by means of a pipe $q$, provided with stop-cock $l$, while the vats B, C, communicate with each other by a pipe $q'$ provided with stop-cock $l'$. By means of the pipes $a$, $b$, the necessary degree of heat within the vats A, B, can be obtained by means of the steam passing through said pipes and the perforations thereof, into the vats where said steam is condensed and the water of condensation may be drawn off through cocks $k$ $k'$ located near the bottoms of the vats.

The vats A, B, C, are supported upon suitable frames or tables A', B', C' respectively, and the vat A is arranged somewhat higher than vat B, while the latter is somewhat higher than the vat C, whereby the flow of the liquid from vat A to vat B and from the latter to vat C will be accelerated.

The pipes $q$, $q'$ communicate with the vats A, B, at points horizontally above the cocks $k$ $k'$ so that no water of condensation will be carried off or decanted through said pipes $q$ $q'$ into the vats B, and C, respectively.

The vat C is arranged in a heating chamber G having a constant temperature of about 30°. This vat may be of any suitable material and has a concave bottom C' provided with a number of tapering openings $c$, in which are adapted to fit the tapering ends of wooden valves $d$, arranged vertically within the vat C. Each valve or rod $d$, is provided at its lower end with a threaded socket $d'$ to receive a screw $h$ supported by a bridge $i$, screwed to the under side of the bottom of the vat. By turning the screw the tapered end of the valve will be caused to more or less close the openings c, to permit variable quantities of the separated oleine to pass through said openings into a wooden receiver E, arranged beneath the vat C and slightly inclined said receiver E serving as a chute to deliver the oleine to a suitable vessel placed outside of the chamber G. A perforated pipe D surrounding the vat C and communicating with a gas supply furnishes the means for heating the chamber G.

In Figs. 4 and 5 we show a vat C which has more of a truncated cone shape than that shown in Fig. 1 the interior of said vat in Figs. 4 and 5 being therefore more tapering and more readily permitting the separated oleine to pass through the openings c.

In carrying out our process we place the suet or tallow to be treated in the vat A where it is heated by the steam passing through the pipe a, and openings o, thereof, and liquefies; we then add to the liquefied tallow from one per cent. to three per cent. of pulverized manganese and permit the whole to boil for about three-quarters of an hour or an hour, the manganese serving to clarify the tallow. After maintaining the temperature for about four or five hours and settling we decant or draw off the liquid matter contained in vat A into vat B through pipe q, the extraneous matter or residues being allowed to remain in vat A which may afterward be used for grease. We now boil the liquid in vat B for about half-an-hour and then add from two per cent. to five per cent. of cream-of-tartar mixed with a small quantity of hot water and allow the whole to rest and settle for from three to four hours. The separation of the oleine and stearine from the suet is accomplished during this step of the operation. At the end of this time we decant or draw off into vat C through pipe q' the separated liquids and allow them to stand for from four to six days according to the temperature. Owing to the difference in time between the steps of operation performed in vats A, B, and that performed in vat C we would employ a sufficient number of vats C to receive the separated liquids from vats A, B, during said time of four to six days. We show but one vat C however, which is sufficient to illustrate the principle of operation. At the end of that time the oleine will be completely separated from the stearine; the oleine is then allowed to pass through the openings c, (valves d, having been raised to permit said passage) and falling into the chute E is conducted to a receiving vessel. The oleine having been discharged the valves d, are lowered to close the openings c, and the stearine can then be obtained in a more or less solid state from within the vat C.

What we claim is—

1. The herein described process of separating oleine and stearine from suet or rendered tallow, which consists in liquefying the tallow and adding thereto manganese to clarify the same; then allowing the mass to settle and decanting the non-residuary portion; heating said portion again and adding thereto cream-of-tartar and allowing the mass to settle; decanting the same and finally subjecting it to heat and simultaneously allowing the same to settle until the oleine and stearine are separated, as described.

2. In an apparatus of the character described, the combination with the vats A, B, and C, having communication with each other of steam pipes arranged in said vats A and B, draw-off cocks for the said vats A, B, a heating chamber within which said vat C is arranged, means for heating said chamber, discharge openings and valves in said vat C, and a chute arranged beneath the same and adapted to receive the contents of said vat, as described.

3. In an apparatus of the character described, the combination with the vats A, B, and C, arranged above one another as described, and having communication with each other of steam pipes arranged in said vats A, B, draw-off cocks for the said vats A, B, a heating chamber within which said vat C is arranged, means for heating said chamber, discharge openings and valves in said vat C and a chute arranged beneath the same and adapted to receive the contents of said vat, as described.

4. In an apparatus of the character described, the combination with the vats A, B, and C, of steam pipes leading into said vats A, B, and communicating with a main steam pipe, pipes leading from vat A to vat B and from the latter to vat C, draw-off cocks for said vats A, B located below the level of the said connecting pipes where they enter the vats A, B, a heating chamber within which said vat C is arranged, a gas supply pipe leading into said chamber and surrounding the vat C, discharge openings and valves arranged in the bottom of said vat, and a chute arranged beneath said vat and adapted to receive the contents of the same, as described.

In testimony that we claim the foregoing we have hereunto set our hands this 30th day of March, 1892.

EDOUARD JOSEPH JEAN BAPTISTE BENOIT.
JOSÉ SOLER Y VILA.

Witnesses:
G. RATEAU,
JOSEPH SALING.